(12) United States Patent
Kim et al.

(10) Patent No.: US 9,345,016 B2
(45) Date of Patent: May 17, 2016

(54) CHANNEL INFORMATION TRANSMITTING METHOD AND DEVICE

(71) Applicant: LG ELECTRONICS INC., Seoul (KR)

(72) Inventors: Hakseong Kim, Anyang-si (KR); Seungmin Lee, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 56 days.

(21) Appl. No.: 14/386,416

(22) PCT Filed: Mar. 20, 2013

(86) PCT No.: PCT/KR2013/002271
§ 371 (c)(1),
(2) Date: Sep. 19, 2014

(87) PCT Pub. No.: WO2013/141592
PCT Pub. Date: Sep. 26, 2013

(65) Prior Publication Data
US 2015/0043475 A1    Feb. 12, 2015

Related U.S. Application Data

(60) Provisional application No. 61/614,482, filed on Mar. 22, 2012.

(51) Int. Cl.
*H04W 72/04* (2009.01)
*H04W 76/00* (2009.01)
(Continued)

(52) U.S. Cl.
CPC ........... *H04W 72/042* (2013.01); *H04L 5/0037* (2013.01); *H04L 5/0048* (2013.01);
(Continued)

(58) Field of Classification Search
CPC ..... H04W 4/005; H04W 24/08; H04W 28/00; H04W 28/021; H04W 72/04; H04W 72/0406; H04W 72/042; H04W 72/082; H04W 72/085; H04W 72/087; H04W 72/14; H04W 76/00; H04W 76/023; H04L 1/0026; H04L 5/0037; H04L 5/0057
See application file for complete search history.

(56) References Cited

U.S. PATENT DOCUMENTS

| 2012/0014334 A1 | 1/2012 | Oh et al. |
| 2012/0093098 A1 | 4/2012 | Charbit et al. |

(Continued)

FOREIGN PATENT DOCUMENTS

| KR | 10-2009-0005676 A | 1/2009 |
| KR | 10-2009-0062435 A | 6/2009 |

(Continued)

OTHER PUBLICATIONS

Wang et al., "Resource Allocation Optimization for Device-to-Device Communication Underlaying Cellular Networks", Vehicular Technology Conference (VTC Spring), IEEE 73rd, May 18, 2011.

*Primary Examiner* — Ahmed Elallam
(74) *Attorney, Agent, or Firm* — Birch, Stewart, Kolasch & Birch, LLP

(57) ABSTRACT

A channel information transmitting method and device are disclosed. The method may comprise: a step in which a base station transmits first channel state information (CSI)-request triggering information to first user equipment (UE); a step in which the base station receives the channel state information of a first D2D link channel from the first UE in response to the first channel from the first UE in response to the first CSI-request triggering information; and a step in which the base station allocates the resource of the first D2D link channel to second UE on the basis of the channel state information. Accordingly, the present invention enables data to be transmitted directly between the user equipment without passing through the base station, thereby increasing the speed of data transmission between the user equipment and distributing the load thereof.

10 Claims, 6 Drawing Sheets

(51) Int. Cl.
  *H04L 5/00* (2006.01)
  *H04W 4/00* (2009.01)
  *H04W 72/08* (2009.01)
  *H04W 92/18* (2009.01)
  *H04L 1/00* (2006.01)
  *H04W 76/02* (2009.01)

(52) U.S. Cl.
  CPC ............ *H04L5/0053* (2013.01); *H04L 5/0057* (2013.01); *H04W 4/005* (2013.01); *H04W 72/082* (2013.01); *H04L 1/0026* (2013.01); *H04W 76/023* (2013.01); *H04W 92/18* (2013.01)

(56) References Cited

U.S. PATENT DOCUMENTS

| | | | | |
|---|---|---|---|---|
| 2012/0129540 A1* | 5/2012 | Hakola | ............... | H04W 72/042 455/450 |
| 2013/0195026 A1* | 8/2013 | Johnsson | ................. | H04B 1/69 370/329 |
| 2013/0252654 A1* | 9/2013 | Dimou | ................. | H04W 72/04 455/509 |
| 2014/0004867 A1* | 1/2014 | Noh | .................... | H04W 76/023 455/450 |
| 2014/0064203 A1* | 3/2014 | Seo | ....................... | H04W 28/06 370/329 |
| 2014/0219095 A1* | 8/2014 | Lim | .................... | H04W 72/085 370/235 |
| 2014/0321423 A1* | 10/2014 | Kalhan | ............... | H04W 76/023 370/330 |
| 2015/0156757 A1* | 6/2015 | Kalhan | ................. | H04L 1/1607 370/330 |

FOREIGN PATENT DOCUMENTS

| | | |
|---|---|---|
| KR | 10-2011-0089311 A | 8/2011 |
| KR | 10-2012-0006900 A | 1/2012 |
| WO | WO 2010/049801 A1 | 5/2010 |

* cited by examiner

CHANNEL INFORMATION TRANSMITTING METHOD AND DEVICE

CROSS REFERENCE TO RELATED APPLICATIONS

This application is the National Phase of PCT International Application No. PCT/KR2013/002271, filed on Mar. 20, 2013, which claims priority under 35 U.S.C. 119(e) to U.S. Provisional Application No. 61/614,482, filed on Mar. 22, 2012, all of which are hereby expressly incorporated by reference into the present application.

BACKGROUND OF THE INVENTION

1. Field of the Invention

The present invention relates to wireless communication and, more particularly, to a channel information transmitting method and device.

2. Related Art

In a typical cellular communication system, a user equipment always sends and receives data to and from a base station. Therefore, in order for the user equipment to transmit data to a different user equipment, the sender user equipment should first transmit data to the base station, and then the base station should transmit the data to the different user equipment. In this case, the channel used for a user equipment to transmit data to a base station is called a uplink channel, while the channel used for a base station to transmit data to a user equipment is called a downlink channel.

Meanwhile, in a Device-to-Device (D2D) communication system, data transmission can be performed directly among wireless devices without employing a base station. Therefore, D2D communication is also called direct communication or D2D communication.

When the D2D communication is performed, a single transmission channel is formed among wireless devices; therefore, data transmission is made possible among the wireless devices without employing the base station. In the D2D communication where a transmission channel is formed among wireless devices participating in the D2D communication and resources are allocated to the data transmission channel, it is necessary to transmit predetermined control information to the wireless devices participating in the D2D communication through the base station.

SUMMARY OF THE INVENTION

An object of the present invention is to provide a D2D communication method.

Another object of the present invention is to provide a device which carries out the D2D communication method.

To achieve the aforementioned objects, a method for controlling D2D communication meant for a base station according to one aspect of the present invention comprises a step in which the base station transmits first channel state information (CSI) request triggering information to a first user equipment (UE), a step in which the base station receives channel state information of a first D2D link channel from the first UE in response to the first CSI request triggering information, and a step in which the base station allocates resources of the first D2D link channel to a second UE based on the channel state information. Therefore, resources of the first D2D link channel can be used for the second UE to transmit data to the first UE through the first D2D link channel, and the first CSI request triggering information can include an identifier of the second UE. The first CSI request triggering information can be included in downlink control information (DCI) transmitted on a Physical Downlink Control Channel (PDCCH), and the first CSI request triggering information can include Cell-Radio Network Temporary Identification (C-RNTI) information of the second UE. The first CSI request triggering information can be included in the DCI transmitted on the PDCCH; the first CSI request triggering information can include index information of the second UE indexed based on a D2D transmission UE list; and the D2D transmission UE list can be a list mapping the second UE onto the index thereof. The method for controlling D2D communication can further comprise a step in which the base station receives D2D request information transmitted by the second UE, and the D2D request information can include information indicating the first UE to which the second UE attempts to establish a first D2D link. The method for controlling D2D communication can further comprise a step in which the base station transmits second CSI triggering information to the second UE, a step in which the base station receives channel state information of a second D2D link channel from the second UE in response to the second CSI triggering information, and a step in which the base station allocates resources of the second D2D link channel to the first UE based on the channel state information. Resources of the second D2d link channel can be used for the first UE to transmit data to the second UE through the second D2D link channel, and the second CSI request triggering information can include an identifier of the first UE.

To achieve the aforementioned objects, a base station according to another aspect of the present invention comprises a processor, where the processor can be configured to transmit first CSI request triggering information to a first UE, receive channel state information of a first D2D link channel from the first UE in response to the first CSI request triggering information, and allocate resources of the first D2D link channel to a second UE based on the channel state information. Resources of the first D2D link channel can be used for the second UE to transmit data to the first UE through the first D2D link channel, and the first CSI request triggering information can include an identifier of the second UE. The first CSI request triggering information can be included in the DCI transmitted on a PDCCH, and the first CSI request triggering information can include C-RNTI information of the second UE. The first CSI request triggering information can be included in the DCI transmitted on a PDCCH; the first CSI request triggering information can include index information of the second UE indexed based on a D2D transmission UE list; and the D2D transmission UE list can be a list mapping the second UE onto the index thereof. The processor can be configured to receive D2D request information transmitted by the second UE, and the D2D request information can include information indicating the first UE to which the second UE attempts to establish a first D2D link.

The processor can be configured to transmit second CSI triggering information to the second UE, receive channel state information of a second D2D link channel from the second UE in response to the second CSI request triggering information, and allocate resources of the second D2D link channel to the first UE based on the channel state information. Resources of the second D2D link channel can be used for the first UE to transmit data to the second UE through the second D2D link channel, and the second CSI request triggering information can include an identifier of the first UE.

The present invention enables data to be transmitted directly between the wireless devices without passing through the base station, thereby increasing the speed of data transmission between the wireless devices and distributing the load thereof.

DESCRIPTION OF EXEMPLARY EMBODIMENTS

The UE used in an embodiment of the present invention can be stationary or mobile. The UE can also be called a Mobile Station (MS), Mobile Terminal (MT), User Terminal (UT), SueNBcribe Station (SS), wireless device, Personal Digital Assistant (PDA), wireless modem, handheld device, and station.

In what follows, a base station used in an embodiment of the present invention usually refers to a fixed station performing communication with a UE and can also be called an evolved-NodeB (eNB), Base Transceiver System (BTS), and access point.

The name of a signal used in an embodiment of the present invention is arbitrary and thus can be defined differently. The signal can be transmitted in the form of an independent signal but can also be transmitted being included in or masked with another signal.

Figure 1:
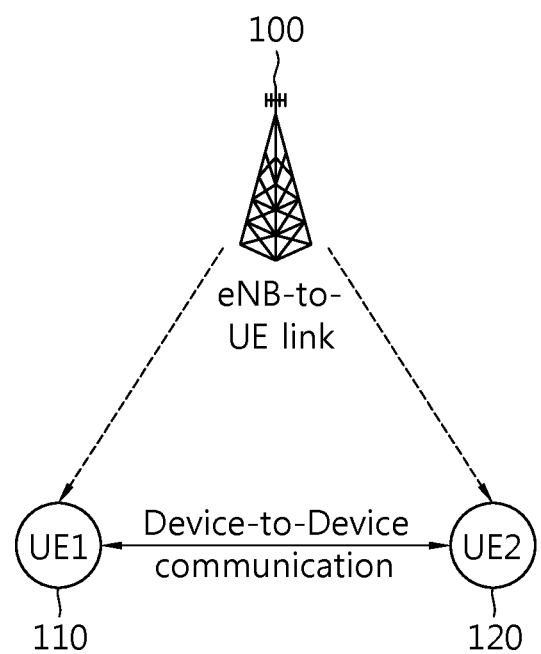
FIG. 1 illustrates D2D communication according to an embodiment of the present invention.

FIG. 1 illustrates D2D communication according to an embodiment of the present invention.

D2D communication in the Long Term Evolution (LTE)-advanced network refers to the communication where UEs in the same cell or within neighboring cells establish a direct communication link between the UEs and send and receive data directly through the direct communication link without employing a base station. In the case of direct communication performed by UEs transmitting and receiving data through a direct communication link established between the UEs, too, the base station is still able to control the D2D communication. For example, the base station can establish a direct communication link between UEs and allocate resources for transmitting and receiving data between the UEs through the direct communication link. In other words, a control operation by a base station such as the eNB is required to perform D2D communication.

With reference to FIG. 1, in case UE1 110 and UE2 120 carry out D2D communication in the LTE-Advanced network, eNB 100 can manage resources and a transmission state of a direct communication link between the UEs. The eNB 100, the UE1 110, and the UE2 120 can analyze the state of D2D communication and control the D2D communication by transmitting and receiving control signals periodically.

For example, at the time of data transmission from UE1 110 to UE2 120, the eNB 100 can use a control channel to allocate a data channel for data transmission from the UE1 110 to the UE2 120. As another example, the eNB 100 can allocate a control channel meant for Hybrid Automatic Retransmit reQuest (HARQ) operation between the UE1 110 and the UE2 120.

In case D2D communication is carried out, a procedure at the eNB 100 carried out when data are transmitted and received between UEs can be simplified by not transmitting and receiving the data through the eNB 100. Also, the UEs carrying out D2D communication are capable of transmitting data to other UEs by using little power, and a data transmission rate between the UEs can be increased as the data are transmitted directly between the UEs without passing through the eNB 100. In addition, since the data transmission area formed by the UEs participating in the D2D direct communication can be regarded as a kind of small cell, the D2D direct communication can benefit the advantages such as increase of network capacity, load distribution, and increase of cell size.

In what follows, UE, eNB, and D2D communication used in the embodiments of the present invention can be referred to differently as terminal, base station, and device-to-device direct communication.

Figure 2:
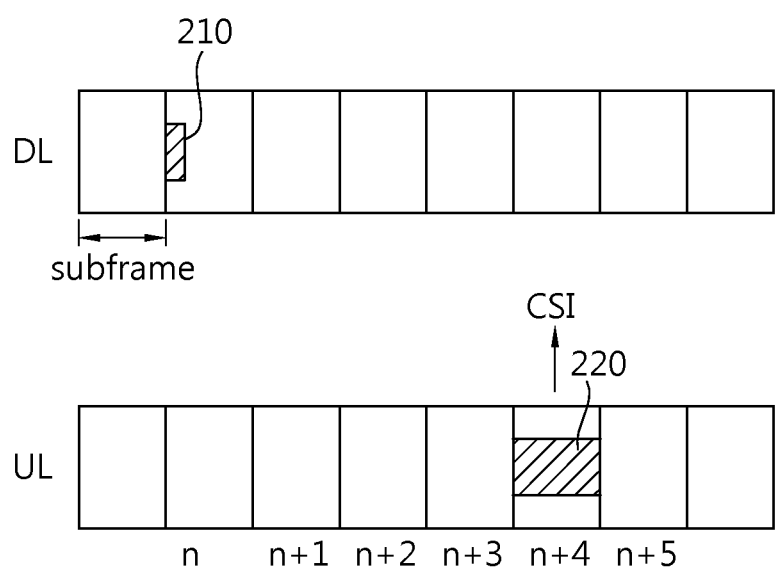
FIG. 2 illustrates a CSI report method of a UE according to Channel Quality Indicator (CQI) request of an eNB.

FIG. 2 illustrates a CSI report method of a UE according to Channel Quality Indicator (CQI) request of an eNB.

With reference to FIG. 2, the UE receives from subframe n the UL grant which includes scheduling information about a Physical Uplink Shared Channel (PUSCH) to a Physical Downlink Control Channel (PDCCH) 210. The UL grant can include the CQI request field.

Table 1 shows one example of a two-bit CQI request field. The value or the number of bits of the CQI request field is only an example.

TABLE 1

| The value in the CQI request field | Description |
|---|---|
| 00 | CSI report is not triggered |
| 01 | CSI report with respect to a serving cell is triggered |
| 10 | CSI report with respect to a first set of the serving cell is triggered |
| 11 | CSI report with respect to a second set of the serving cell is triggered |

The eNB can inform the UE beforehand about the information of a first and a second set by which the CSI report is triggered. If the CSI report is triggered, a wireless device transmits the CSI onto the PUSCH 220 at subframe n+k. In this case, k=4, but it is only an example.

In the embodiment of the present invention below, disclosed will be a method for transmitting channel state information of a D2D link channel between UEs employing D2D communication according to a CQI request of a base station.

Figure 3:
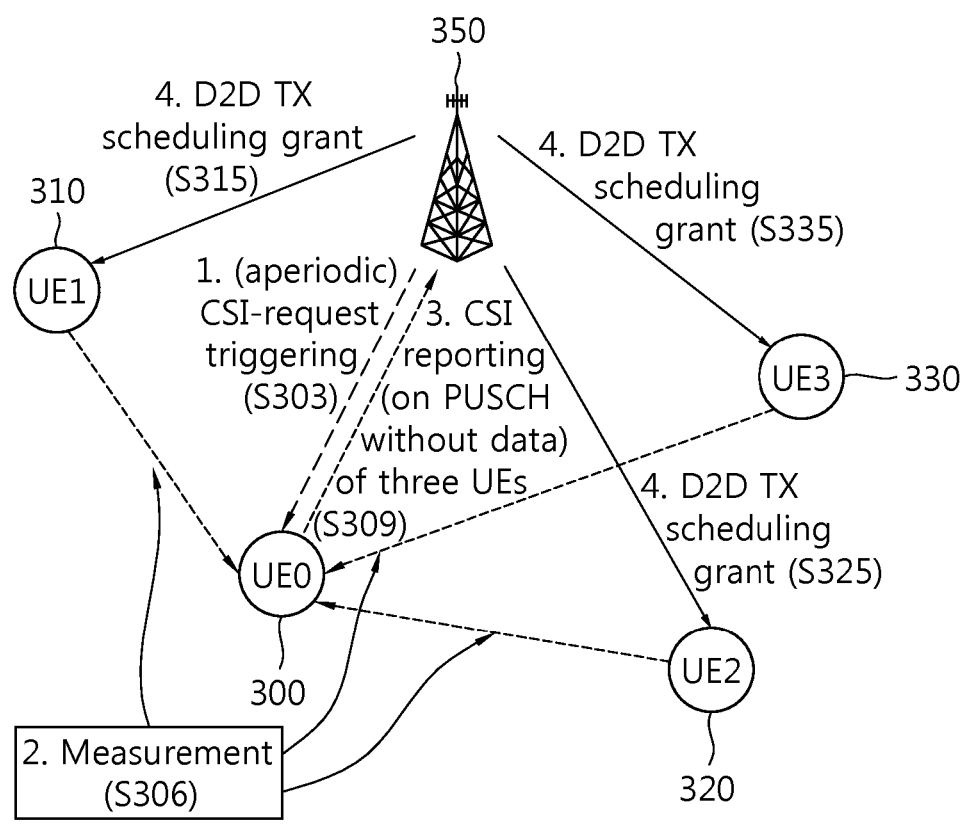
FIG. 3 illustrates a D2D communication method according to an embodiment of the present invention.

FIG. 3 illustrates a D2D communication method according to an embodiment of the present invention.

To illustrate D2D communication, FIG. 3 discloses a method for at least one of D2D transmission UEs (for example, UE1 310, UE2 320, and UE3 330) to transmit data to a D2D reception UE (for example, UE0 330) through a first D2D link channel.

The first D2D link channel can be defined as a channel for transmitting data from a D2D transmission UE to a D2D reception UE.

In FIG. 3, the UE receiving resources used for data transmission from the eNB and transmitting data through the first D2D link channel is defined as the D2D transmission UE, and the UE receiving data through the first D2D link channel from the D2D transmission UE as the D2D reception UE. For example, the D2D transmission UE can be at least one of UE1 310, UE2 320, and UE3 330; and the D2D reception UE can be UE0 300. In what follows, an embodiment of the present invention discloses a method for a D2D reception UE to receive data from a D2D transmission UE.

UE0 300 can receive CSI-request triggering information from the eNB 350, S303.

The eNB 350 can request reporting channel state information about a first D2D link channel made of a D2D transmission UE and UE0 300 by transmitting the CSI request triggering information to UE0 300. The eNB 350 can transmit the CSI request triggering information to the D2D reception UE to establish the first D2D link channel before the first D2D link channel is formed between the D2D transmission UE and the D2D reception UE. The CSI request triggering information can include information meant for requesting channel information about the first D2D link channel between the D2D transmission UE and the D2D reception UE.

As another embodiment, in case a D2D link is already established between the D2D transmission UE and the D2D reception UE, the CSI request triggering information can be used for determining channel state information of an existing D2D link. For example, the eNB 350 transmits the CSI request triggering information to UE0 300 periodically or non-periodically so that the eNB 350 can obtain channel state information about the first D2D link channel between the D2D transmission UE and the D2D reception UE.

The CSI request triggering information can include information about a particular D2D transmission UE. Based on the information about the particular D2D transmission UE included in the CSI request triggering information, channel state information about the first D2D link channel from the corresponding UE can be measured. As a yet another embodiment, the CSI request triggering information can be transmitted to a UE after including information about a measurement set specified to measure channel state information. In the following embodiment of the present invention, disclosed in detail will be UE identification information for channel state measurement included in the CSI request triggering information.

UE0 300 measures channel state information about a first D2D link channel formed between the D2D transmission UE specified by the CSI request triggering information and the UE0 300, S306.

The UE0 300 can obtain channel state information about the first D2D link channel based on the D2D transmission UE information included in the CSI request triggering information 303.

For example, in case the D2D transmission UE information included in the CSI request triggering information contains identifiers of UE1 310, UE2 320, and UE3 330, the UE0 300 can measure channel state information about the first D2D link channel between the UE0 300 and each of the UE1 310, the UE2 320, and the UE3 330; and transmit the measured channel state information to the eNB 350.

The UE0 300 can measure channel state information about the first D2D link channel by using information capable of measuring a channel state such as a reference signal transmitted from the UE1 310, UE2 320, or UE3 330 to the UE0 300.

The UE0 300 transmits measured channel state information to the eNB 350 through the CSI reporting information S309.

The UE0 300 can transmit channel state information of a first D2D link channel between the D2D transmission UE and the UE0 300 to the eNB 350 through the CSI reporting information, where the channel state information is measured based on the CSI request triggering information. The UE0 300 can transmit the CSI reporting information to the eNB 350 by including the CSI reporting information in the PUSCH.

The eNB 350 can transmit D2D link grant information to the D2D transmission UE based on the received channel state information S315, S325, S335.

The D2D transmission UE can receive D2D scheduling grant information which allows D2D communication, where the D2D scheduling grant information is received from the eNB 350 through the first D2D link channel. The D2D transmission UE which has received the D2D scheduling grant information can transmit data to the UE0 300, which is a D2D reception UE, through the first D2D link channel.

The D2D scheduling grant information resembles a resource allocation signal transmitted form the existing eNB 350. In this case, the D2D transmission UE can determine whether the scheduling grant information transmitted by the eNB 350 schedules data transmission and reception between the eNB 350 and the D2D transmission UE or whether the scheduling grant information transmitted by the eNB 350 schedules downlink resources between the D2D reception UE and the D2D transmission UE. In the following embodiment of the present invention, the scheduling grant information which schedules data transmission and reception between the D2D transmission UE and the eNB 350 is defined as eNB scheduling grant information.

For example, the D2D transmission UE can determine whether the scheduling grant information received based on Downlink Control Information (DCI) of a control channel transmitted from the eNB 350 corresponds to the eNB scheduling grant information or the D2D scheduling grant information. As a different method, whether the scheduling grant information received by the D2D transmission UE corresponds to the eNB scheduling grant information or the D2D scheduling grant information can be determined by using a combination of the DCI and other information or time domain, frequency domain, or spatial domain (for example, antenna port or layer)

In what follows, an embodiment of the present invention further discloses CSI request triggering information transmitted from the eNB 250.

The CSI request triggering information can be transmitted in the DCI format. The D2D reception UE receiving the CSI request triggering information according to the DCI format can determine the first D2D link channel state from the D2D transmission UE specified by the CSI request triggering information.

Again, with reference to FIG. 3, it can be assumed that the eNB 350 transmits the CSI request triggering information 303 to the UE0 300 which is the D2D reception UE. The eNB 350 can request channel state information with respect to the D2D transmission UE from the UE0 300 by using the Channel Quality Indicator (CQI) request bits as the CSI request triggering information 303, where the CQI request bits are defined in the DCI format used as a uplink grant transmitted to the UE0 300.

As described above, the CSI request triggering information can include information indicating whether the UE0 300 is supposed to report the channel state information about the D2D link established between the UE0 300 and some UE to the eNB 350. The CSI request triggering information can include about the D2D transmission UE in a various form, which measures channel state information. This kind of information can be called measurement list information. The measurement list information can include information about a measurement target D2D UE meant for measuring channel state information. The measurement list information may manage a list configured by the RRC or a list indicated by L1/L2 (Layer 1/Layer 2) signaling separately or together and thus can be transmitted being included in the CSI request triggering information transmitted to the D2D reception UE. The measurement list information can use the following method.

(1) The eNB 350 can incorporate information about an active D2D link into the CSI request triggering information and transmit the CSI request triggering information to the D2D reception UE. The D2D reception UE can transmit only the channel state information about the active D2D link to the eNB 350.

(2) The eNB 350 can incorporate information about a measurement set into the CSI request triggering information and transmit the. CSI request triggering information to the D2D reception UE. The D2D reception UE can measure channel state information about the D2D transmission UE included in the measurement set of the DCI and transmit the measured channel state information to the eNB 350.

(3) The eNB 350 can incorporate an individual UE ID list, which is the information about individual D2D transmission UEs, into the CSI request triggering information and transmit the CSI request triggering information to the D2D reception UE. The D2D reception UE can measure channel state information of the D2D transmission UE included in a transmission UE list of the DCI and transmit the measured channel state information to the eNB 350.

The CSI request triggering information described in (1) to (3) can correspond to a signal transmitted through the DCI included in the PDCCH transmitted from the eNB 350.

Figure 4:
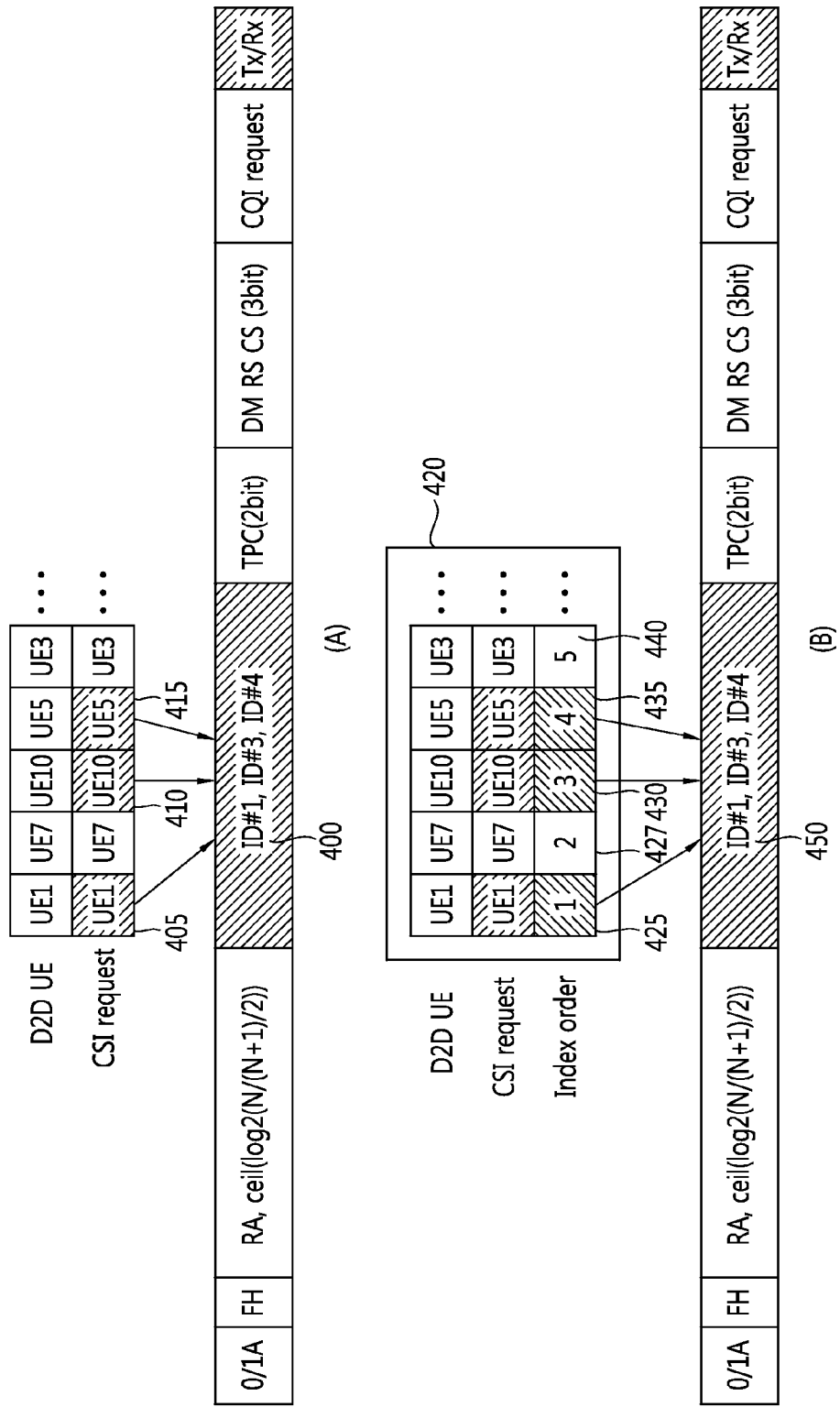
FIG. 4 illustrates an example of DCI including CSI request triggering information according to an embodiment of the present invention.

FIG. 4 illustrates an example of DCI including CSI request triggering information according to an embodiment of the present invention.

FIGS. 4(A) and (B) illustrate that the CSI request triggering information is included in the DCI format 0 disclosed in the 3GPP TS 36.212 V10.2.0. The DCI format 0 is only an example; therefore, the CSI request triggering information can be included in other DCI formats.

With reference to FIG. 4(A), the CSI request triggering information can include identification information which specifies a D2D transmission UE meant for measuring channel state of a first D2D link channel. The CSI request triggering information 400 can include ID (for example, Cell-Radio Network Temporary Identification (C-RNTI)) of a UE as D2D transmission UE identification information, which specifies a D2D transmission UE. For example, in case a channel measurement target D2D transmission UE corresponds to UE1 405, UE10 410, or UE5 415, the C-RNTI information of the UE1 405, UE10 410, or UE5 415 can be transmitted being included in the CSI request triggering information.

As another method for specifying a D2D transmission UE meant for measuring downlink channel state, with reference to FIG. 4(B), the CSI request triggering information 450 can include index information specifying a D2D transmission UE as D2D transmission UE identification information. The index information specifying the D2D transmission UE can be transmitted beforehand by a signal from a upper layer.

For example, the index of a D2D transmission UE can be mapped to a D2D transmission UE in a D2D transmission UE list 420 including information about the D2D transmission UE. The D2D transmission UE list 420 can be shared with the D2D reception UE and the eNB beforehand. As shown in FIG. 4(B), UE1 can be indexed by 1 (425); UE7 by 2 (427); UE10 by 3 (430); UE5 by 4 (435); and UE3 by 5 (440). The CSI request triggering information can include only the indexing information. In other words, in the case of FIG. 4(B), the CSI request triggering information 450 can include the index 1 (425), index 3 (430), and index (435) only.

FIGS. 4(A) and (B) particularly assume that an aperiodic CSI reporting technique of the DCI format 0 is applied to trigger CSI reporting. However, the data format is only an example; therefore, a different format (for example, DCI format 1A) rather than the DCI format 0 can also be used to indicate a UE for reporting channel state information. The DCI format is only an example used to transmit the CSI request triggering signal. In addition to the DCI format, the CSI reporting request can be performed by using various forms of information, an embodiment of which also belong to the technical scope of the present invention.

Figure 5:
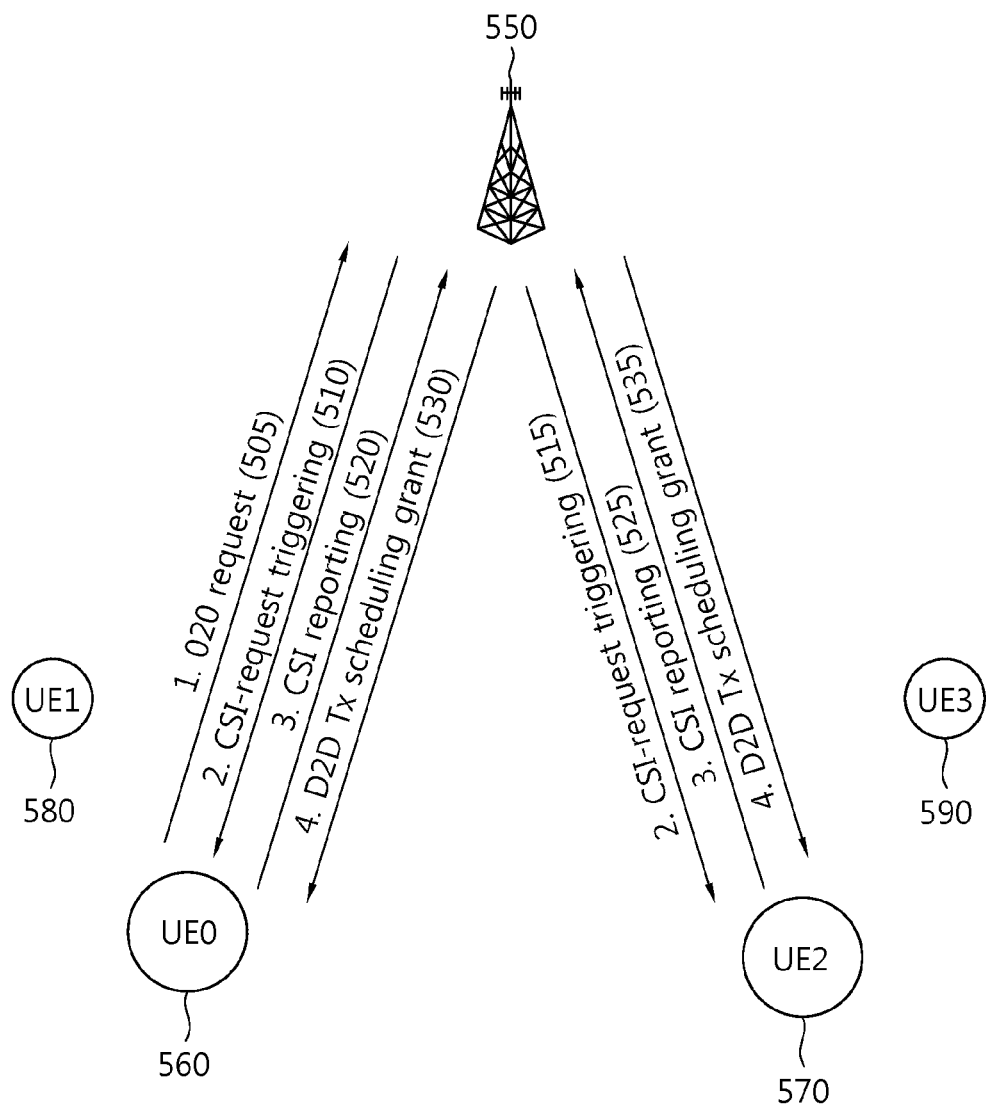
FIG. 5 illustrates a D2D communication method according to an embodiment of the present invention.

FIG. 5 illustrates a D2D communication method according to an embodiment of the present invention.

FIG. 5 discloses a method for UE0 560 to request a D2D setup and establish a D2D link for carrying out D2D communication with neighboring UEs.

In FIG. 5, a UE requesting D2D communication is called a transmission UE, and a target UE of the D2D communication request is called a D2D reception UE. D2D transmission UE and D2D reception UE are the terms defined for the convenience of description; therefore, the D2D reception UE can transmit data to the D2D transmission UE.

In what follows, in an embodiment of the present invention, UE0 560 can correspond to the D2D transmission UE, while at least one of UE1 580, UE2 570, and UE3 590 can become the D2D reception UE. It is further assumed that a first D2D link channel is defined as the channel from the UE0 560 to UE1 580, UE2 570, and UE3 590; and a second D2D link channel is defined as the channel from the UE1 580, UE2 570, and UE3 590 to the UE0 560.

With respect to FIG. 5, UE0 560 can transmit D2D request information to the eNB 550 to perform D2D communication with neighboring UEs S505.

The UE0 560, which is the D2D transmission UE, can transmit D2D request information to the eNB 550 to perform D2D communication with the D2D reception UE. The D2D request information can be used as a signal for requesting allocation of transmission resources to the eNB 550 for the UE0 560 which is the D2D transmission UE and the D2D reception UE to perform D2D communication.

The D2D transmission UE can transmit information of the D2D reception UE supposed to perform D2D communication with the D2D transmission UE to the eNB 550 to request D2D communication by incorporating the information of the D2D reception UE into the D2D request information. For example, in case UE0 560 wants to perform D2D communication with the UE2 570 among the D2D reception UEs, the D2D transmission UE can transmit information specifying the UE2 570 by incorporating the information specifying the UE2 570 into the D2D request information.

As another embodiment, the D2D transmission UE can transmit to the eNB 550 request information indicating intention of D2D communication without specifying information of the D2D reception UE supposed to perform D2D communication by incorporating the request information into the D2D request information.

For example, in case the UE0 560 is unable to know the information about the D2D reception UE, the D2D transmission UE can transmit request information indicating intention of D2D communication without specifying information of the D2D reception UE by incorporating only the request information.

The eNB 550 which has received the D2D request information 505 can transmit CSI request triggering information to the D2D transmission UE and the D2D reception UE S510, S515, which requests reporting information about a first and a second D2D link channel between the D2D reception UE to which the D2D transmission UE attempts to be connected and the D2D transmission UE.

The D2D transmission UE can measure channel state information of the first D2D channel ranging from the D2D reception UE to the D2D transmission UE based on the CSI request triggering information transmitted to the D2D transmission UE. Also, the D2D transmission UE can measure channel state information of the second D2D channel link ranging from the D2D reception UE to the D2D transmission UE based on the CSI request triggering signal transmitted to the D2D reception UE. The CSI request triggering information transmitted to the D2D transmission UE and the CSI request triggering information transmitted to the D2D reception UE can have D2D UE information different from each other. The CSI request triggering information transmitted to the D2D transmission UE can include identification information of the D2D reception UE, and the CSI request triggering information transmitted to the D2D reception UE can have identification information of the D2D transmission UE.

For example, a reference signal can be used to obtain channel state information of the first and the second D2D channel link between the D2D reception UE and the D2D transmission UE. The D2D transmission UE can measure channel state information of the first D2D channel link based on the reference signal transmitted from the D2D reception UE to the D2D transmission UE. Also, based on the reference signal information transmitted from the D2D transmission UE to the D2D reception UE, channel state information of the second D2D channel link can be measured.

As described above, the CSI request triggering information can correspond to the signal transmitted from the eNB 550 to the D2D transmission UE and the D2D reception UE to establish a D2D link between the D2D transmission UE and the D2D reception UE before the D2D link is established. As another embodiment, in case the D2D link has already been established between the D2D transmission UE and the D2D reception UE, the CSI request triggering information can be used to determine channel state information of the first and the second D2D link channel. For example, the eNB 550 can transmit the CSI request triggering information to the D2D transmission UE and the D2D reception UE periodically or non-periodically to obtain the channel state information between the D2D transmission UE and the D2D reception UE.

The D2D reception UE and the D2D transmission UE transmit the measured channel state information to the eNB 550 through the CSI reporting information S520, S525.

The channel state information measured by the D2D reception UE and the D2D transmission UE can be transmitted to the eNB 550 through the CSI reporting information.

The eNB 550 allocates the first D2D channel link resources and the second D2D channel link resources for D2D communication based on the channel state information measured by the D2D reception UE and the D2D transmission UE S530, S535.

The eNB 550 can allocate the first and the second D2D channel meant for D2D communication based on channel state information measured by the D2D reception UE and the D2D transmission UE, and the D2D reception UE and the D2D transmission UE can perform D2D communication based on the resources allocated by the eNB 550.

Figure 6:
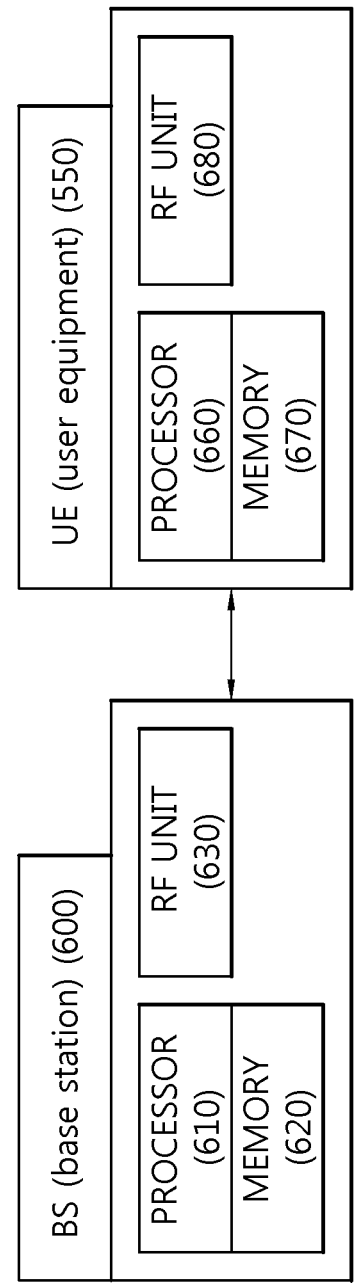
FIG. 6 is a block diagram illustrating a wireless communication system according to an embodiment of the present invention.

FIG. 6 is a block diagram illustrating a wireless communication system according to an embodiment of the present invention.

With reference to FIG. 6, the base station 600 comprises a processor 610, memory 620, and Radio Frequency (RF) unit 630. The memory 620, being connected to the processor 610, stores various kinds of information needed to operate the processor 610. The RF unit 630, being connected to the processor 610, transmits and/or receives a radio signal. The processor 610 implements a proposed function, process, and/or method. In the embodiments described above, operation of the base station can be implemented by the processor 610.

For example, the processor 610 can be configured to transmit CSI request triggering information to the D2D reception UE and to receive channel state information of the first D2D link channel from the D2D reception UE in response to the CSI request triggering information. The processor 610 can make the D2D transmission UE transmit data by allocating resources of the first D2D link channel to the D2D transmission UE based on the received channel state information.

Also, the processor 610 can receive the D2D request information transmitted by the D2D transmission UE, transmit the CSI request triggering information to the D2D transmission UE, and receive channel state information of the second D2D link channel from the D2D transmission UE in response to the CSI request triggering information. The processor 610 can be configured to allocate resources of the second D2D link channel to the first D2D UE based on the channel state information.

The wireless device 650 can comprise a processor 660, memory 670, and RF unit 680. The memory 670, being connected to the processor 660, stores various kinds of information needed to operate the processor 660. The RF unit 680, being connected to the processor 660, transmits and/or receives a radio signal. The processor 660 implements a proposed function, process, and/or method. In the embodiments described above, operation of the wireless device can be implemented by the processor 660.

For example, the processor 660 can be configured to transmit data directly to another UE based on D2D scheduling grant information from the base station 600. Also, the processor 660 can be configured to measure channel state information of the D2D link with respect to another UE based on the CSI request triggering information transmitted from the base station 600.

The processor can include Application-Specific Integrated Circuit (ASIC), other chipsets, logical circuit, and/or a data processing module. The memory can include Read-Only Memory (ROM), Random Access Memory (RAM), flash memory, memory card, storage medium, and/or other storage module. The RF unit can include a baseband circuit to process a radio signal. In case the embodiments are implemented by software, the techniques described above can be implemented in the form of a module (procedure, function, and the like) carrying out the functions described above. A module can be stored in the memory and run by the processor. The memory can be installed inside or outside the processor and can be connected to the processor through various well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for a base station to control device to device (D2D) communication, comprising:
   transmitting, by the base station, first channel state information (CSI) request triggering information to a first user equipment (UE);
   receiving, by the base station, channel state information of a first D2D link channel from the first UE in response to the first CSI request triggering information; and
   allocating, by the base station, resources of the first D2D link channel to a second UE based on the channel state information,
wherein resources of the first D2D link channel are used for the second UE to transmit data to the first UE through the first D2D link channel, and
   wherein the first CSI request triggering information includes an identifier of the second UE.

2. The method of claim 1,
   wherein the first CSI request triggering information is included in downlink control information (DCI) transmitted on a Physical Downlink Control Channel (PDCCH), and
   wherein the first CSI request triggering information includes Cell-Radio Network Temporary Identification (C-RNTI) information of the second UE.

3. The method of claim 1,
   wherein the first CSI request triggering information is included in downlink control information (DCI) transmitted on the PDCCH;
   wherein the first CSI request triggering information includes index information of the second UE indexed based on a D2D transmission UE list; and
   wherein the D2D transmission UE list is a list mapping the second UE onto the index of the second UE.

4. The method of claim 1, further comprising
   receiving, by the base station, D2D request information transmitted by the second UE,
   wherein the D2D request information includes information indicating the first UE to which the second UE attempts to establish a first D2D link.

5. The method of claim 4, further comprising:
   transmitting, by the base station, second CSI triggering information to the second UE;
   receiving, by the base station, channel state information of a second D2D link channel from the second UE in response to the second CSI triggering information; and
   allocating, by the base station, resources of the second D2D link channel to the first UE based on the channel state information,
   wherein resources of the second D2D link channel are used for the first UE to transmit data to the second UE through the second D2D link channel, and
   wherein the second CSI request triggering information includes an identifier of the first UE.

6. A base station, the base station comprising a processor
   the processor is configured to transmit first CSI request triggering information to a first UE,
   receive channel state information of a first D2D link channel from the first UE in response to the first CSI request triggering information, and
   allocate resources of the first D2D link channel to a second UE based on the channel state information,
   wherein resources of the first D2D link channel are used for the second UE to transmit data to the first UE through the first D2D link channel; and
   wherein the first CSI request triggering information includes an identifier of the second UE.

7. The base station of claim 6,
   wherein the first CSI request triggering information is included in downlink control information (DCI) transmitted on a PDCCH, and
   wherein the first CSI request triggering information includes C-RNTI information of the second UE.

8. The base station of claim 6,
   wherein the first CSI request triggering information is included in downlink control information (DCI) transmitted on a PDCCH;
   wherein the first CSI request triggering information includes index information of the second UE indexed based on a D2D transmission UE list; and
   wherein the D2D transmission UE list is a list mapping the second UE onto the index of the second UE.

9. The base station of claim 6,
   wherein the processor is configured to receive D2D request information transmitted by the second UE, and
   wherein the D2D request information includes information indicating the first UE to which the second UE attempts to establish a first D2D link.

10. The base station of claim 9,
    wherein the processor is configured to transmit second CSI triggering information to the second UE, receive channel state information of a second D2D link channel from the second UE in response to the second CSI request triggering information, and allocate resources of the second D2D link channel to the first UE based on the channel state information,
    wherein resources of the second D2D link channel are used for the first UE to transmit data to the second UE through the second D2D link channel, and
    wherein the second CSI request triggering information includes an identifier of the first UE.

* * * * *